United States Patent
Nahar

(10) Patent No.: US 6,830,186 B1
(45) Date of Patent: Dec. 14, 2004

(54) CHECKOUT DEVICE WITH PRODUCE GUARD

(75) Inventor: Rathindra Nahar, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 115 days.

(21) Appl. No.: 10/224,865

(22) Filed: Aug. 21, 2002

(51) Int. Cl.$^7$ ................................................ G06K 7/10
(52) U.S. Cl. .................. 235/462.14; 235/383; 235/379; 235/385
(58) Field of Search ............................ 235/462.14, 383, 235/379, 385, 454; 177/180, 238, 262, 242, 243; 705/16, 20, 21

(56) References Cited

U.S. PATENT DOCUMENTS

| | | | | |
|---|---|---|---|---|
| 4,716,281 A | * | 12/1987 | Amacher et al. | ........... 235/383 |
| 5,635,906 A | * | 6/1997 | Joseph | ..................... 340/572.3 |
| 5,834,708 A | * | 11/1998 | Svetal et al. | ................. 177/180 |
| 5,978,772 A | * | 11/1999 | Mold | ........................... 705/16 |
| 6,085,979 A | * | 7/2000 | Maddox | ................ 235/462.13 |
| 6,155,489 A | * | 12/2000 | Collins et al. | ......... 235/462.01 |
| 6,206,285 B1 | * | 3/2001 | Baitz et al. | ................. 235/380 |
| 6,281,796 B1 | * | 8/2001 | Canipe et al. | ........... 340/572.3 |
| 6,343,739 B1 | * | 2/2002 | Lippert | ....................... 235/383 |

* cited by examiner

Primary Examiner—Diane I. Lee
Assistant Examiner—Kimberly D. Nguyen
(74) Attorney, Agent, or Firm—Paul W. Martin

(57) ABSTRACT

A checkout device with a produce guard for separating a produce item from a vertical window of the checkout device. The checkout device includes a barcode reader and a produce guard. The barcode reader includes a housing containing a vertical window, a load cell assembly in the housing, and a horizontal weigh plate supported by the load cell assembly. The produce guard includes a horizontal member between the horizontal weigh plate and the load cell assembly, including an edge, and a vertical member coupled to the edge of the horizontal member for separating a produce item on the horizontal weigh plate from the vertical window of the barcode reader.

1 Claim, 4 Drawing Sheets

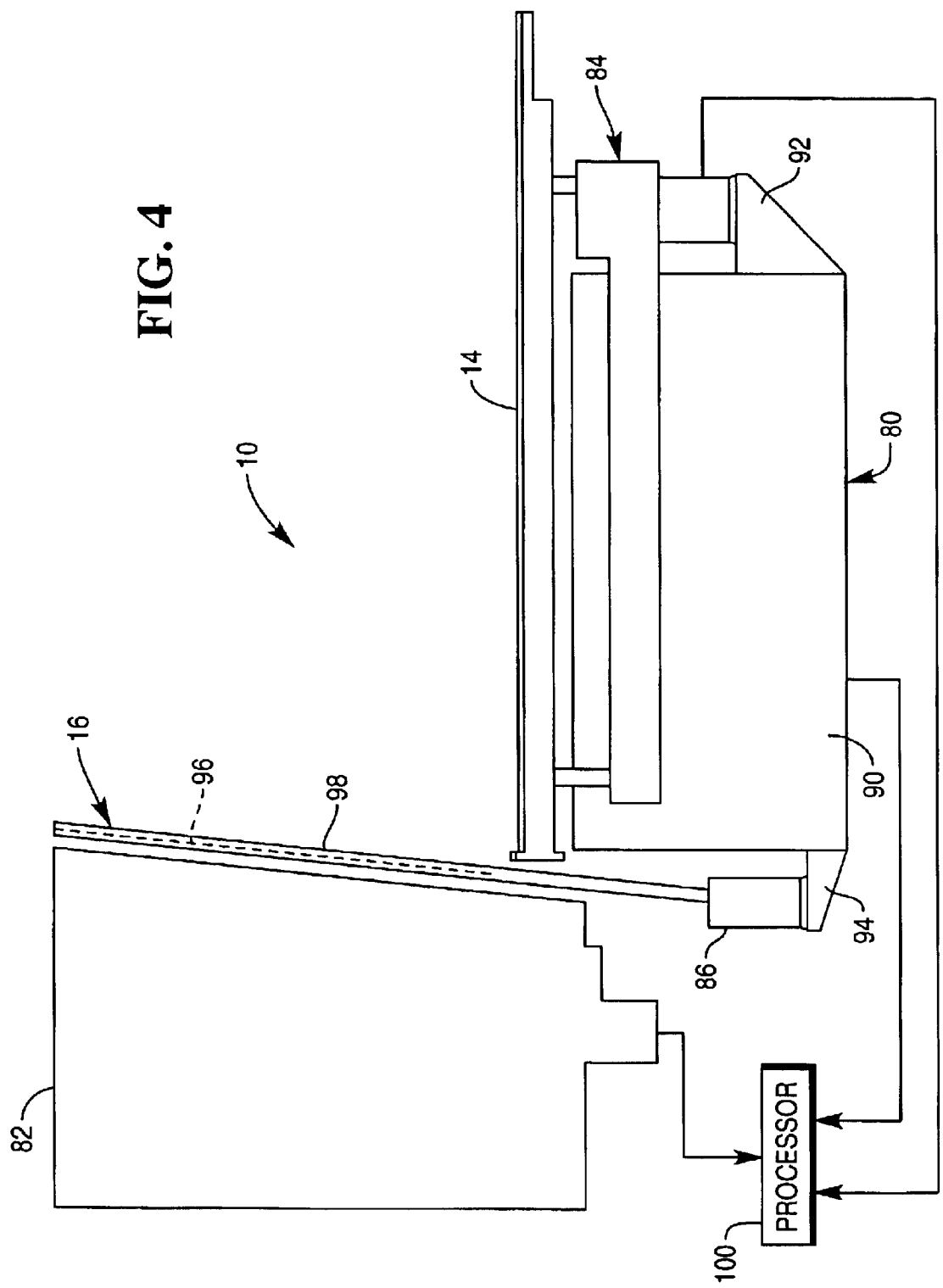

CHECKOUT DEVICE WITH PRODUCE GUARD

BACKGROUND OF THE INVENTION

The present invention relates generally to checkout devices and, more specifically, to a checkout device with a produce guard.

Optical barcode readers are well known for their usefulness in retail checkout and inventory control. A common type of barcode reader is a dual aperture barcode reader of the type described in the commonly assigned U.S. Pat. No. 5,229,588. Such a barcode reader has a horizontal aperture and a substantially vertical aperture. This patent is hereby incorporated by reference.

Such barcode readers are often combined with a scale for weighing produce items. The scale includes a weigh plate over the horizontal aperture. Checkers who use the resulting checkout device may incorrectly position produce items on the weigh plate so as to lean them against a window in the vertical aperture.

Therefore, it would be desirable to provide a checkout device with a produce guard.

SUMMARY OF THE INVENTION

In accordance with the teachings of the present invention, a checkout device with a produce guard is provided.

The checkout device includes a barcode reader and a produce guard. The barcode reader includes a housing containing a vertical window, a load cell assembly in the housing, and a horizontal weigh plate supported by the load cell assembly. The produce guard includes a horizontal member between the horizontal weigh plate and the load cell assembly, including an edge, and a vertical member coupled to the edge of the horizontal member for separating a produce item on the horizontal weigh plate from the vertical window of the barcode reader.

It is accordingly an object of the present invention to provide a checkout device with a produce guard.

It is another object of the present invention to minimize reduction of weight measurements caused by improper positioning of produce items by checkers.

It is another object of the present invention to provide a produce guard that can be easily retrofitted into existing checkout devices.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a side view of a second embodiment of the checkout device and produce guard.

DETAILED DESCRIPTION OF THE PREFERRED EMBODIMENT

Figure 1:
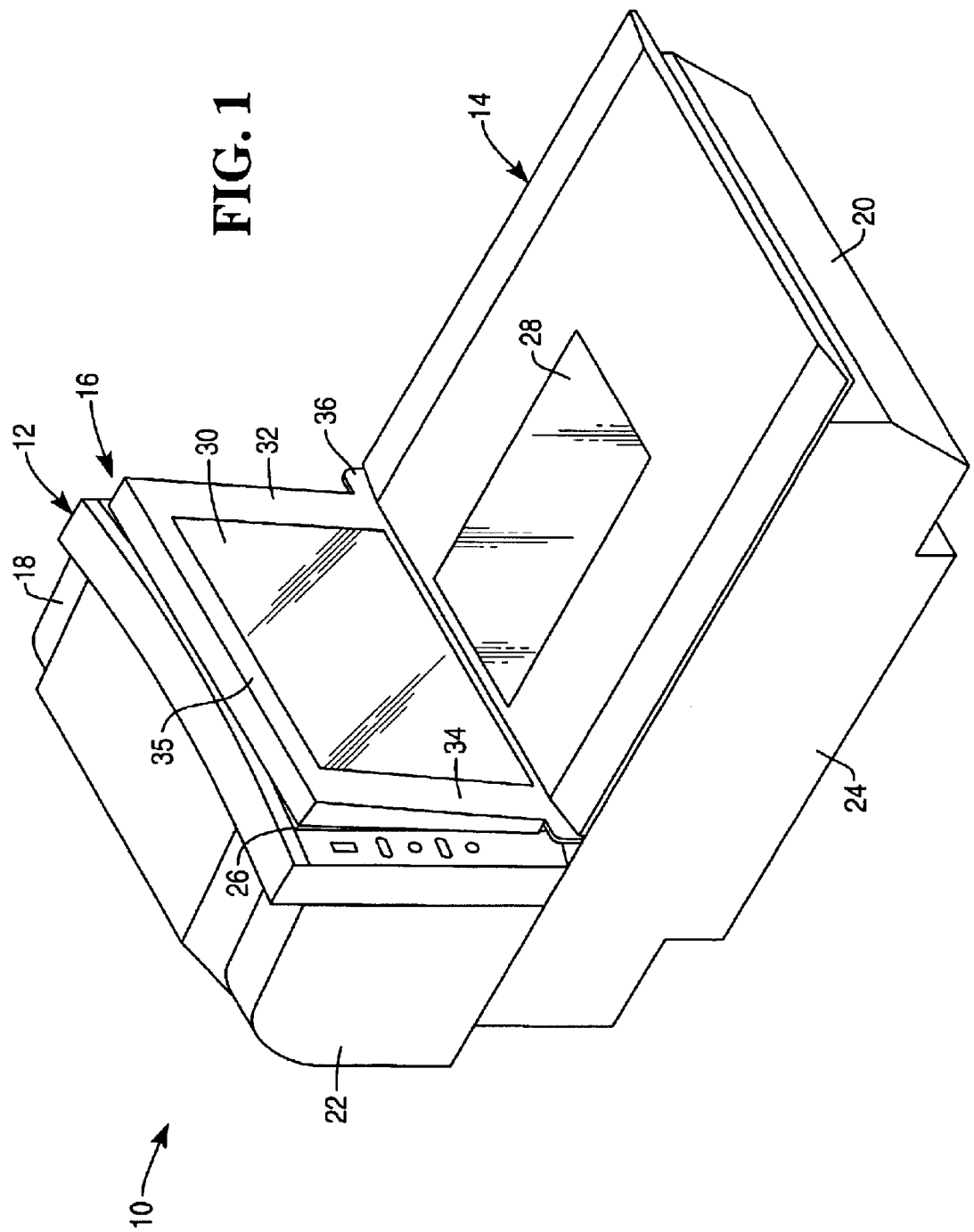
FIG. 1 is a perspective view of a checkout device showing the produce guard.

Referring now to FIG. 1, checkout device 10 includes barcode reader 12, weigh plate 14, and produce guard 16.

Barcode reader 12 includes vertical portion 18 and horizontal portions 20. Vertical portion 18 including housing portion 22 which includes window 26. Horizontal portion 24 includes housing portion 24. Together, vertical and horizontal portions 18 and 24 produce scan lines for scanning barcode labels on products.

Weigh plate 14 includes window 28.

Produce guard 16 includes window 30, vertical support 32, vertical support 34, horizontal support 35 and horizontal support 36. Vertical supports 32 and 34 and horizontal supports 35 and 36 retain window 30. Horizontal support 36 is connected at the bottom of vertical supports 32 and 34. Window 30 is glued to the rear surface of vertical supports 32 and 34 and horizontal supports 35 and 36.

Figure 2:
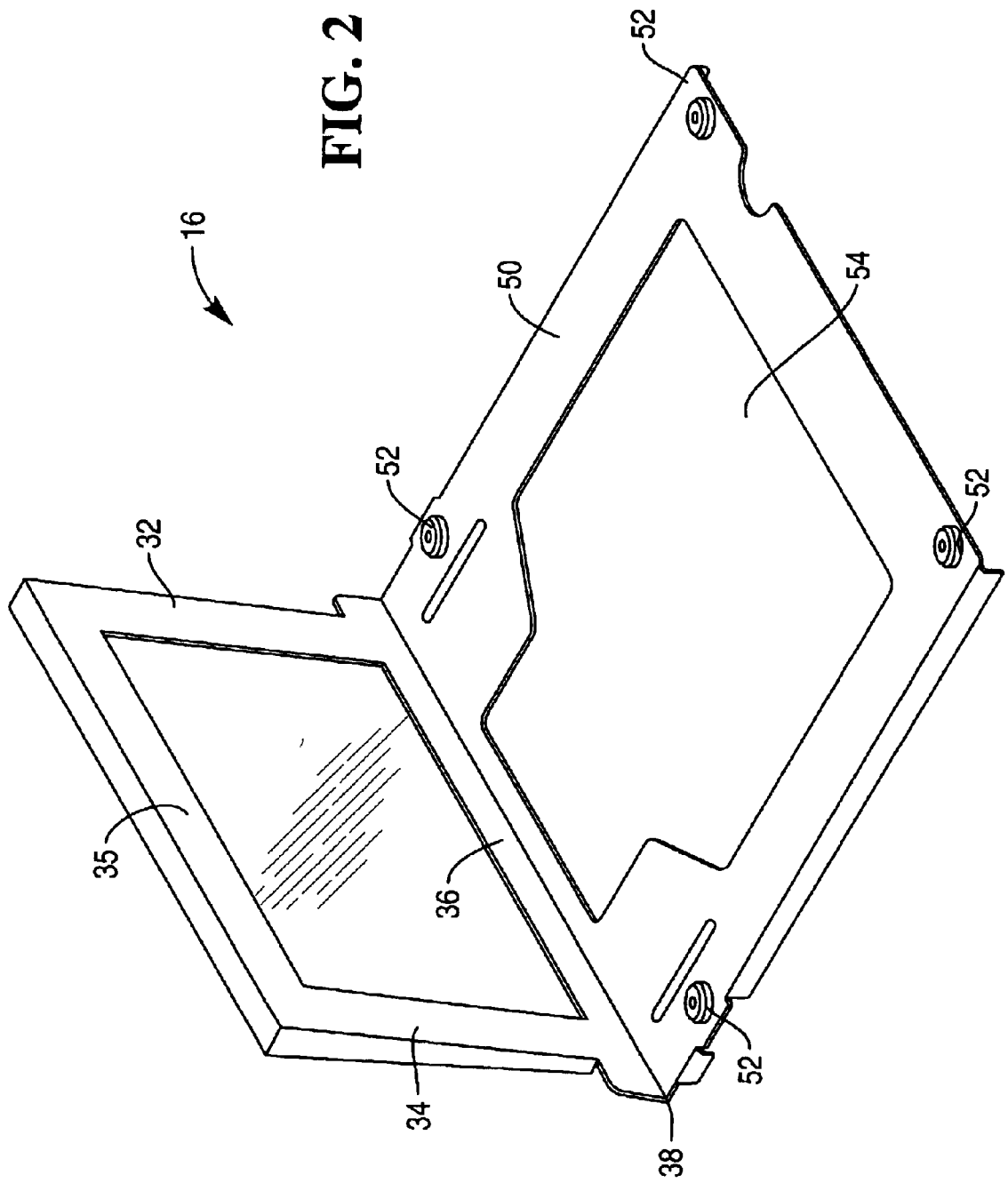
FIG. 2 is a perspective view of the produce guard.

With reference to FIG. 2, produce guard 16 is illustrated in more detail.

Produce guard 16 additionally includes horizontal portion 50, which connects to horizontal support 36 at bend 38. Horizontal portion 50 includes raised portions 52. Horizontal portion 50 also includes aperture 54 that allows scanning light beams to pass through to window 28.

Figure 3:
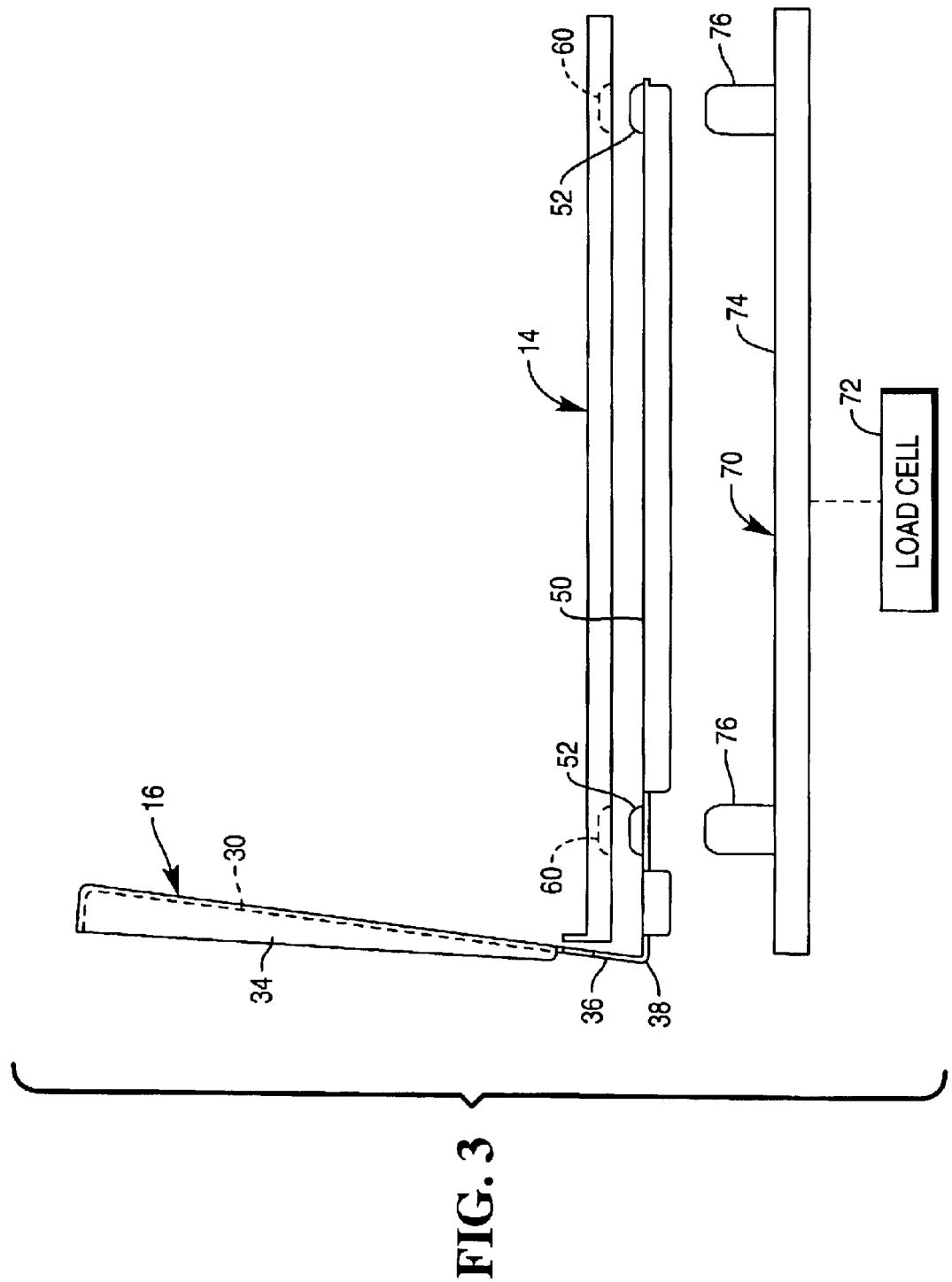
FIG. 3 is an exploded view illustrating the installation of the produce guard.

With reference to FIG. 3, installation of produce guard 16 is illustrated in detail.

Scale assembly 70 includes load cell 72, support bar 74, and supports 76.

Produce guard 16 rests on supports 76 at raised portions 52.

Weigh plate 14 includes indent portions 60 on the underside of weigh plate 14 that conform to the shape of raised portions 52. Weigh plate 14 rests on raised portions 52 at indent portions 60.

With reference to FIG. 4, a second embodiment of checkout device 10 is illustrated. In this embodiment, checkout device 10 includes horizontal and vertical barcode readers 80 and 82. Horizontal barcode reader 80 may include an NCR 7882 barcode reader. Vertical barcode reader 82 may include the vertical portion of the NCR 7875 barcode reader.

Horizontal barcode reader 80 includes load cell assemblies 84 and 86.

Load cell assembly 84 is mounted outside of housing 90 on load cell assembly support 92.

Load cell assembly 86 is mounted outside of housing 90 on load cell assembly support 94.

Weigh plate 14 rests directly on load cell assembly 84.

Produce guard 16 includes window 96 and supports 98 and is generally limited to a single plane. Produce guard 16 rests directly on load cell assembly 86 and is oriented in front of vertical barcode reader 82. Produce guard 16 is strong enough to avoid contact with vertical barcode reader 82.

Processor 100 combines the outputs of horizontal and vertical barcode readers 80 and 82 and load cell assemblies 84 and 86.

Although the present invention has been described with particular reference to certain preferred embodiments thereof, variations and modifications of the present invention can be effected within the spirit and scope of the following claims.

I claim:

1. A checkout device comprising:
  a barcode reader including
    a housing containing a first substantially vertical window;
    a single-plane horizontal weigh plate including a bottom surface including indent portions;

a load cell assembly in the housing including a weigh plate support member with weigh plate support posts; and a produce guard including a horizontal member, which is separate from the horizontal weigh plate, sandwiched between the horizontal weigh plate and the weigh plate support member, including raised portions for contacting the indent portions of the horizontal weigh plate and the weigh plate supports for retaining the horizontal member, and further including an edge and an aperture for allowing scanning light beams to pass; and a substantially vertical member coupled to the edge of the horizontal member for separating a produce item on the horizontal weigh plate from the first substantially vertical window of the barcode reader including a frame and a second substantially vertical window supported by the frame.

* * * * *